March 25, 1941.    W. J. BROWN    2,236,084
ADJUSTABLE FLOW RESTRICTOR
Filed Jan. 7, 1939    2 Sheets-Sheet 1

INVENTOR.
WILLIAM J. BROWN
BY
D. Clyde Jones
ATTORNEY.

March 25, 1941.    W. J. BROWN    2,236,084
ADJUSTABLE FLOW RESTRICTOR
Filed Jan. 7, 1939    2 Sheets-Sheet 2
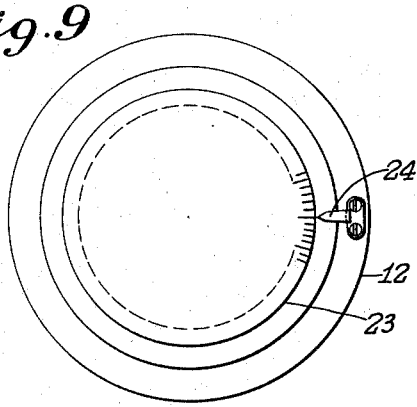
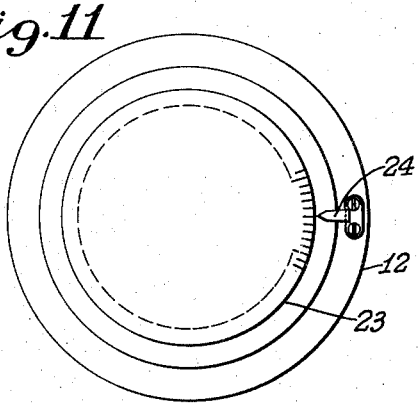
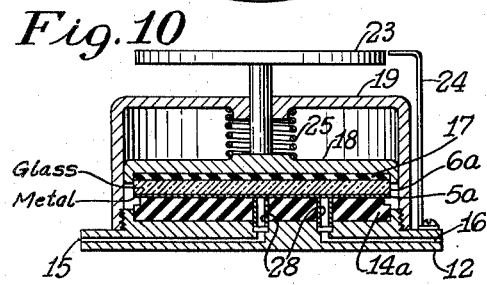
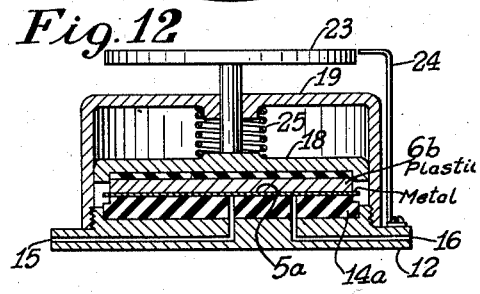
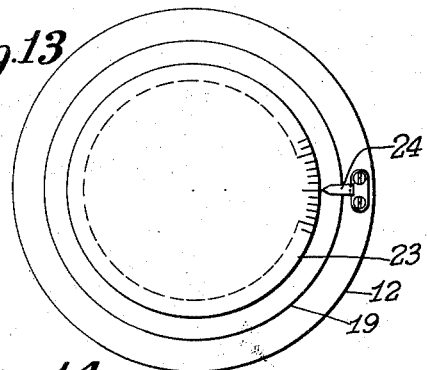
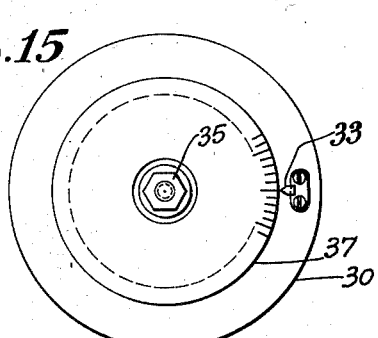
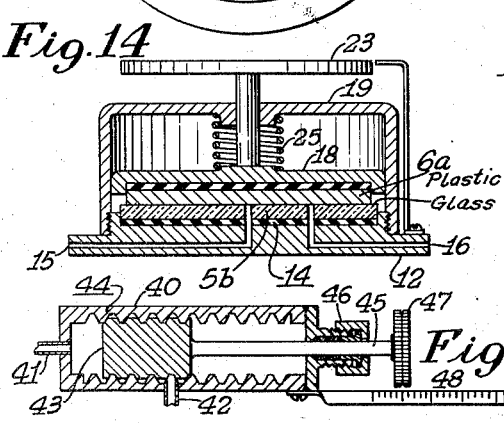
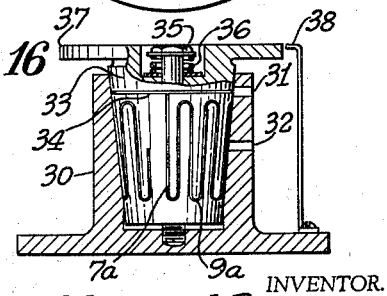
INVENTOR.
WILLIAM J. BROWN
BY D. Clyde Jones
ATTORNEY.

Patented Mar. 25, 1941

2,236,084

UNITED STATES PATENT OFFICE 2,236,084

ADJUSTABLE FLOW RESTRICTOR

William J. Brown, Rochester, N. Y., assignor to Taylor Instrument Companies, Rochester, N. Y., a corporation of New York Application January 7, 1939, Serial No. 249,787

3 Claims. (Cl. 138—43)

This invention relates to adjustable orifices of the vernier type.

In pneumatic control instruments and related devices, particularly of the reset type disclosed in the patent to Hubbard No. 1,985,829, it is desirable to employ adjustable orifices or vernier control valves. Such a reset control system utilizes a damping arrangement including an orifice which is preferably adjustable so that the damping time can be changed at will to compensate for various time lags encountered in service.

Also in various tests it is desirable to bubble air or gas into a medium at a predetermined rate. In the past, such control of a small flow of air or gas has usually been effected by the use of a needle valve. However, the results obtained by the use of such needle valves are not uniform and a given setting of a needle valve does not always give uniformly reproducible results. Furthermore, such needle valves occasionally clog owing to dust and other foreign matter which collects therein from the air or gas passing therethrough.

In accordance with the main features of the invention, there is provided an adjustable orifice or vernier valve of such construction that it can be calibrated for adjustment and for each such adjustment, conditions are always substantially reproducible.

A further feature of the invention relates to an adjustable orifice or vernier valve of simple, inexpensive construction whereby such valves can be manufactured with a high degree of uniformity and at low cost.

Figure 1:
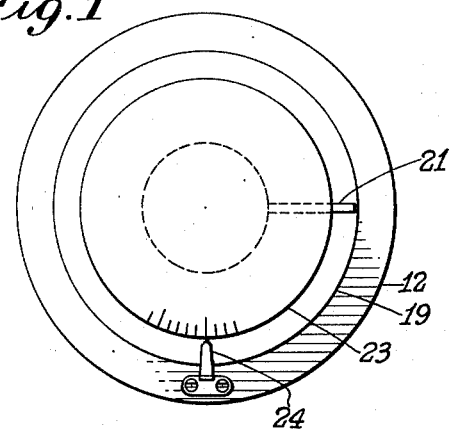
Figure 7:
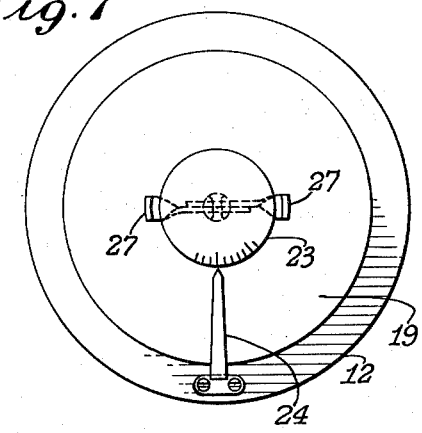
Figure 2:
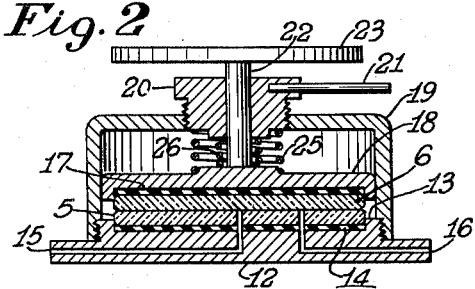
Figure 8:
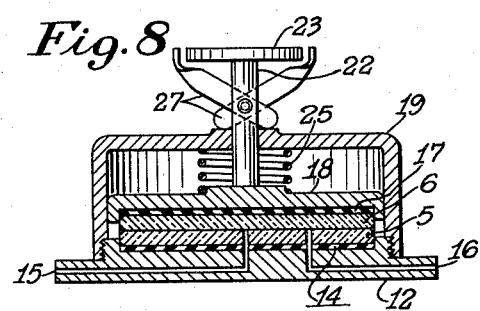
Figure 3:
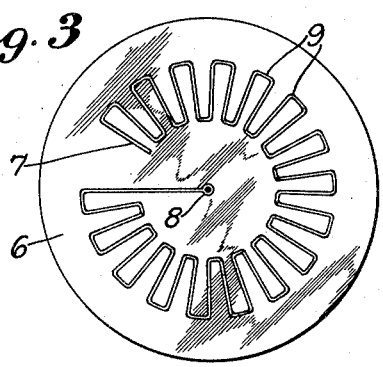
Figure 5:
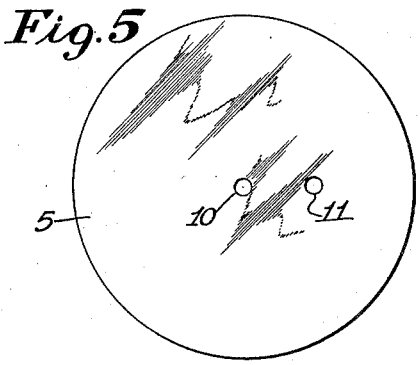
Figure 4:
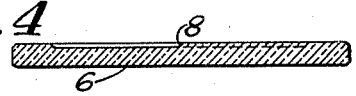
Figure 6:
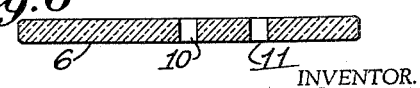

The various features and advantages of the invention will appear from the detailed description and claims when taken with the drawings wherein Fig. 1 is a plan view and Fig. 2 is a vertical section, showing the improved valve or adjustable orifice plate of the present invention; Fig. 3 is a plan view of an etched plate forming a part of the valve; Fig. 4 is a section through the plate of Fig. 3; Fig. 5 is a plan view of a complementary plate and Fig. 6 is a transverse section thereof; Figs. 7 and 8 are respectively a plan view and a vertical section of a modified adjusting arrangement of the valve; and Figs. 9 and 10, 11 and 12, 13 and 14, 15 and 16 are respectively plan and vertical sectional views of four modified forms of the invention; and Fig. 17 is a sectional view of still another modified form of the invention.

The principal elements of the valve include two contacting discs (Figs. 2, 3 and 5), each disc having at least one contacting surface which closely approaches a perfectly flat surface. These discs may be made of glass, metal or plastic material, or preferably one disc may be made of glass and the other disc of dissimilar material. The mentioned surface of the disc 6 has a serpentine groove 7 formed therein preferably with a width of .004 of an inch and a depth of .011 of an inch. However, it will be understood that the mentioned dimensions are given merely by way of example, since there may be wide deviations therefrom as long as the groove is such that it can still be defined as a capillary groove. It will be noted from Fig. 3 that the groove has a portion 8 at the center of the disc and has other portions 9 preferably looped in symmetrical relation with respect to said center. The disc 5 which is of a size sufficient to cover all parts of the capillary groove, has a central aperture or port 10 therethrough to register with the groove portion 8 at the center of the plate 6 and has a second aperture or port 11 therethrough in a position to register with successive loops 9 of the groove, as the discs are rotated with respect to each other.

Since it is desired to make the valve adjustable, the discs 5 and 6 are mounted in the structure illustrated in Figs. 1 and 2. This structure includes a base 12 having an upwardly extending circular cup 13 in which the disc 5 is fastened, a circular rubber cushion 14 being interposed between the disc and the bottom of the cup. The base has an inlet passage 15 formed therein to communicate with the port 10, through a hole in the rubber cushion 14 and also has an outlet passage 16 formed therein to communicate with the port 11 through a second hole in the rubber cushion. The disc 6 is secured to a second rubber cushion 17, in turn, fastened on the underside of a circular flanged plate 18 which is mounted so that it can move the disc 6, not only into but out of engagement with the disc 5 and, in addition, can then freely rotate disc 6. Various arrangements can be utilized to effect this result but in the construction of Figs. 1 and 2, there is employed an inverted cup-like casing 19 which has the interior of its rim internally threaded to engage the external threads on the periphery of the cup portion 13 of the base. This casing has a threaded central opening in its top, to receive a centrally perforated plug 20 provided with external threads, the cooperating threads of the casing and the plug being of high pitch to effect rapid axial movement of the plug in response to limited rotation thereof. The plug is also provided with a rod-like handle 21 so that it can be easily rotated. The circular plate 18 has one end of a stem 22 secured thereto, which stem passes through the opening in the plug, and the upper end of the stem is secured to a dial 23 graduated in units of time or flow. An index 24, fixed to the top of the casing has a pointed free end which serves as a reference point for the graduations on the movable dial.

In order to insure that the contacting surfaces of the discs 5 and 6 are in such snug engagement that there will be a substantially air-tight seal therebetween, a heavy spring 25 is interposed between the plug 20 and the plate 18. This spring encircles the stem 22 and is thereby held in its proper position between the plug and the plate. A light spring 26 also encircling the stem 22, serves to apply light compression to plate 18 even when the compression of the heavy spring is relieved. By this construction the discs are prevented from being blown apart during adjustment.

In the operation of the valve, air or like fluid, the flow of which is to be controlled, is introduced through the inlet passage 15 and port 10 to the center position 8 of the groove 7. The length of the groove between the port 10 and the port 11 determines the rate of the flow of the air through the port 11 and the outlet passage 16. It will be understood that this rate of flow is proportional to the effective length of the groove.

In order to vary the rate of air flow, it is desirable first, to rotate the plug 20 by its handle to relieve the compression of the heavy spring 25. This insures that any dust or grit between the discs will not scratch their contacting surfaces. Then the dial 23 is rotated in the proper direction to give the desired rate of air flow as indicated by the graduations on the dial. After the dial is thus adjusted, the plug 20 is rotated in the reverse direction to place the heavy spring 25 again under compression. It has been found in practice that while air will not leak between the surfaces of discs, infinitesimal oil particles normally present in the air supply, will be drawn by capillary action between the contacting surfaces of the discs, thereby keeping the groove 7 unobstructed by oil.

The modified form of the invention illustrated in Figs. 7 and 8, is similar to that already described and corresponding parts will be designated by like reference characters. In this form, however, the plug 20 is omitted and the stem 22 passes through a central aperture in the top of the case 19. In this instance the light spring 26 is omitted but the heavy spring 25 is interposed between the plate and the inner surface of the casing so that the plate is normally under compression. In order to relieve this compression at least partially during adjustment of the disc, there are provided two levers 27 pivoted at their intermediate points, on the stem. Preferably the short lever arms have their free ends engaging the top of the casing while the long arms of these levers terminate adjacent the dial. Thus, when the valve is to be adjusted, the lever ends adjacent the dial are pressed toward each other so that the other ends of these levers engage the top of the casing. This forces the stem upward and with it the plate 6. With this plate thus raised, the dial can be rotated to effect adjustment as previously described.

In the foregoing arrangement provision was made for separating the discs 5 and 6 during the rotary adjustment thereof in order that their contacting surfaces would not be mutilated by specks of dust therebetween. Further, these plates had surfaces that were almost perfectly flat. In the arrangement of Figs. 9 and 10, while the grooved contacting surface of the glass plate 6a may be almost perfectly flat, it need only have a surface that is commercially flat. The disc 5a however is preferably made of thin metal such as phosphor-bronze with its contacting surface chromium plated. The thickness of this disc may be of the order of .003 to .005 of an inch. In this arrangement the cushion 14a on which this metal disc is mounted preferably has a high degree of resilience so that this disc will conform to the minor irregularities in the surface of the disc 6a, thereby obviating the need of a perfectly flat surface on this disc. In this arrangement since the mounting cushion 14a has a high degree of resilience, metal sleeves 28 are inserted therein to prevent the passages therethrough from collapsing. These sleeves are slidable into the base 12 on compression of the cushion 14a. It will be noted in this form of the invention that no provision is made for relieving the compression of the heavy spring 25 during the rotary adjustment of the dial. This is possible since any particles of dust between the discs 5a and 6a will become embedded in the surface of the metal disc 5a and therefore will not scratch the surface of the glass disc.

In the modified form of the invention shown in Figs. 11 and 12, the disc 6b is formed of a plastic material having the serpentine groove 7 molded therein. The contacting surface of the disc may be almost perfectly flat or only commercially flat. In this arrangement a metal disc 5a of the character disclosed in the preceding form, is also utilized.

In the form of the invention illustrated in Figs. 13 and 14, the disc 6a is made of plastic material having the serpentine groove 7 molded therein as in the preceding form shown in Figs. 11 and 12. In this instance the disc 5b is made of glass and may have either an almost perfectly flat contacting surface or only a commercially flat surface. Here also any dust that is lodged between the two plates or discs will become embedded in the plastic material and therefore will not scratch the glass disc 5b.

In Figs. 15 and 16 there is illustrated a modified valve of the plug type. This valve comprises a valve body 30 and a cooperating plug 33. The body has two ports 31 and 32 extending through the side walls thereof, while the plug in the form of a truncated cone, has its outer surface provided with a serpentine groove 7a having loops 9a adapted to communicate with the port 32 as the plug is rotated with respect to the body. The upper end of the plug has a circumferential groove 34 therein communicating with the serpentine groove 7a and also communicating with the port 31 in the body of the valve. A bolt 35 passing through the plug is threaded in the bottom of the body, while a spring 36 interposed between the head of the bolt and the top portion of the plug, tends to hold the lateral surface of the plug in intimate contact with the internal surface of the valve body. The upper end of the plug may also be provided with a graduated dial 37 rotatable with respect to a fixed index 38 to indicate various degrees of adjustment.

It will be understood that, if desired, means similar to those shown in Figs. 2 or 8 may be applied to the valves disclosed in Figs. 9 to 16, to relieve compression of the springs 25 in order to facilitate adjustment of the valves.

In the modified form of the invention shown in Fig. 17, the valve body 40 is in the form of a hollow cylinder provided with an inlet port 41 in one end and an outlet port 42 in its side. The inner wall of this body is provided with female screw threads adapted to receive the male thread of a cylindrical plug 43. The surfaces of the male and female threads are preferably carefully finished as by grinding with emery powder to provide a substantial air-tight joint therebetween. It will be noted that the projecting edge of the male thread is ground away to leave a space 44 between the bottom of the female thread and the projecting portion of the male thread. Thus the plug when in engagement with the body, in effect, provides a spiral capillary groove. The plug 43 is adjustable lengthwise within the body 40 by means of a stem 45 projecting through the right-hand end of the body as illustrated, where suitable packing means 46 provides a substantial air-tight seal between the body and the stem. The stem terminates in a knurled hand wheel 47 so that the plug can be rotated for adjustment. A graduated scale 48 adjacent the hand wheel indicates the various degrees of adjustment of the plug.

It will be understood that compressed air or other like medium entering through the inlet port 41, passes around the spiral groove defined by the female and male threads on the body and plug respectively, and thence through the outlet port 42. With the plug shown in position 17, the air will pass slowly through the valve owing to the relatively great effective length of the capillary groove. However, when the plug is adjusted to the right, as illustrated, the length of time for the air to pass through the valve will be correspondingly reduced.

The expression "commercially flat surface," as used herein, refers to the type of surface obtained on glass or the like which has been made by ordinary commercial processes. However, the expression "approximately perfectly flat" designates surfaces having such a degree of perfection that only a small number of Newton's rings are present when the mentioned surfaces of two transparent plates, are held tightly in contact.

I claim:
1. A valve comprising two plates having two of their surfaces in approximately perfect contact, means for rotating at least one of said plates with respect to the other about an axis normal to the plane of said surfaces, and releasable means for normally maintaining said surfaces of said plates in intimate contact, one of said plates having a capillary groove of serpentine pattern provided in its contacting surface, the other plate having two spaced ports therein communicating with its contacting surface, one of said ports being located at said axis and communicating with a given point on said groove and the other port communicating with various points on said groove as said parts are relatively rotated.

2. A valve comprising two parts having flat contacting surfaces, said parts being slidably adjustable relative to each other with said surfaces in contact, one of said parts being made of rigid material having a capillary groove formed in its contacting surface, the other said part being made of yieldable material adapted to conform to minor irregularities on the contacting surface of said rigid part and having means communicating with variable lengths of said groove as said parts are slidably adjusted, and means for forcing the contacting surface of said yieldable part into engagement with the contacting surface of said rigid part.

3. A valve comprising two parts having flat contacting surfaces, said parts being slidably adjustable relative to each other with said surfaces in contact, one of said parts being made of rigid material having a capillary groove formed in its contacting surface, the other of said part being made of thin sheet metal adapted to conform to minor irregularities on the contacting surface of said rigid part and having means communicating with variable lengths of said groove as said parts are slidably adjusted, and resilient means for forcing the contacting surface of said metal part into engagement with the contacting surface of said rigid part.

WILLIAM J. BROWN.